(12) United States Patent
Beigang et al.

(10) Patent No.: US 10,100,877 B2
(45) Date of Patent: Oct. 16, 2018

(54) INNER JOINT PART AND ROLLER ELEMENT OF A TRIPOD CONSTANT VELOCITY JOINT

(71) Applicant: GKN Driveline International GmbH, Lohmar (DE)

(72) Inventors: Wolfgang Beigang, Neunkirchen-Seelscheid (DE); Ulrich Brochheuser, Neunkirchen (DE); Orkan Eryilmaz, Lohmar (DE)

(73) Assignee: GKN Driveline International GmbH, Lohmar (DE)

( * ) Notice: Subject to any disclaimer, the term of this patent is extended or adjusted under 35 U.S.C. 154(b) by 71 days.

(21) Appl. No.: 14/900,223

(22) PCT Filed: Jun. 18, 2014

(86) PCT No.: PCT/EP2014/062897
§ 371 (c)(1),
(2) Date: Dec. 21, 2015

(87) PCT Pub. No.: WO2015/000709
PCT Pub. Date: Jan. 8, 2015

(65) Prior Publication Data
US 2016/0138658 A1    May 19, 2016

(30) Foreign Application Priority Data
Jul. 1, 2013  (DE) .................. 10 2013 106 868

(51) Int. Cl.
*F16D 3/202* (2006.01)
*F16D 3/205* (2006.01)

(52) U.S. Cl.
CPC .... *F16D 3/2055* (2013.01); *F16D 2003/2026* (2013.01); *Y10S 464/905* (2013.01)

(58) Field of Classification Search
USPC .......................................... 464/111
See application file for complete search history.

(56) References Cited

U.S. PATENT DOCUMENTS

| 4,854,917 A * | 8/1989 | Mizukoshi ............ F16D 3/2055 |
| | | 464/111 |
| 6,533,668 B2 * | 3/2003 | Mizukoshi ............ F16D 3/2055 |
| | | 464/111 |

(Continued)

FOREIGN PATENT DOCUMENTS

| DE | 10106727 A1 | 9/2002 |
| DE | 102007057538 A1 | 6/2009 |

(Continued)

OTHER PUBLICATIONS

International Search Report for PCT/EP2014/062897 dated Nov. 18, 2014 (with English translation; 5 pages).

*Primary Examiner* — Greg Binda
(74) *Attorney, Agent, or Firm* — Bejin Bieneman PLC

(57) ABSTRACT

An inner joint part of a tripod constant velocity joint comprises a hub having an axis of rotation. Three projections extend radially outwardly. There is an adjoining transition region and a bearing region. A spherical circumferential surface of each projection forms a first surface line extending in a first plane. A resulting inner sphere contacts opposite points of the first surface line extending at least in first angle ranges adjacent to a respective point outside the inner sphere. A second surface line in a second plane touches the inner sphere at touch points only at the height of the largest diameter of the projection and extends at least in second angle ranges adjacent to the respective touch point within the inner sphere. A roller element has a convex inner circumferential surface, an extension line forming a radius having a maximum magnitude in a central region, less in an adjacent region.

13 Claims, 6 Drawing Sheets

(56) References Cited

U.S. PATENT DOCUMENTS 6,682,434 B2 * 1/2004 Kawakatsu .......... F16D 3/2055
464/111
2011/0053695 A1 3/2011 Yun

FOREIGN PATENT DOCUMENTS

| EP | 1008777 | A2 | 6/2000 |
| EP | 1503097 | A2 | 2/2005 |
| EP | 1505308 | A1 | 2/2005 |
| EP | 1707834 | A2 | 10/2006 |

* cited by examiner

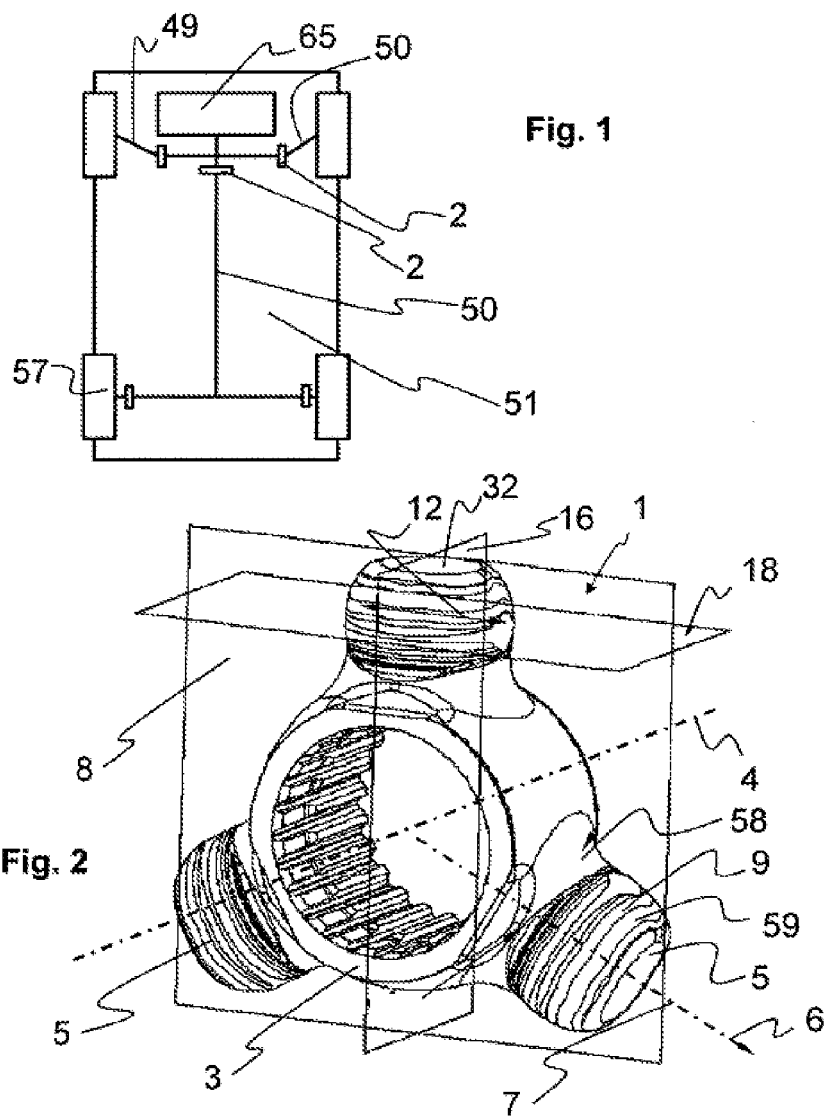

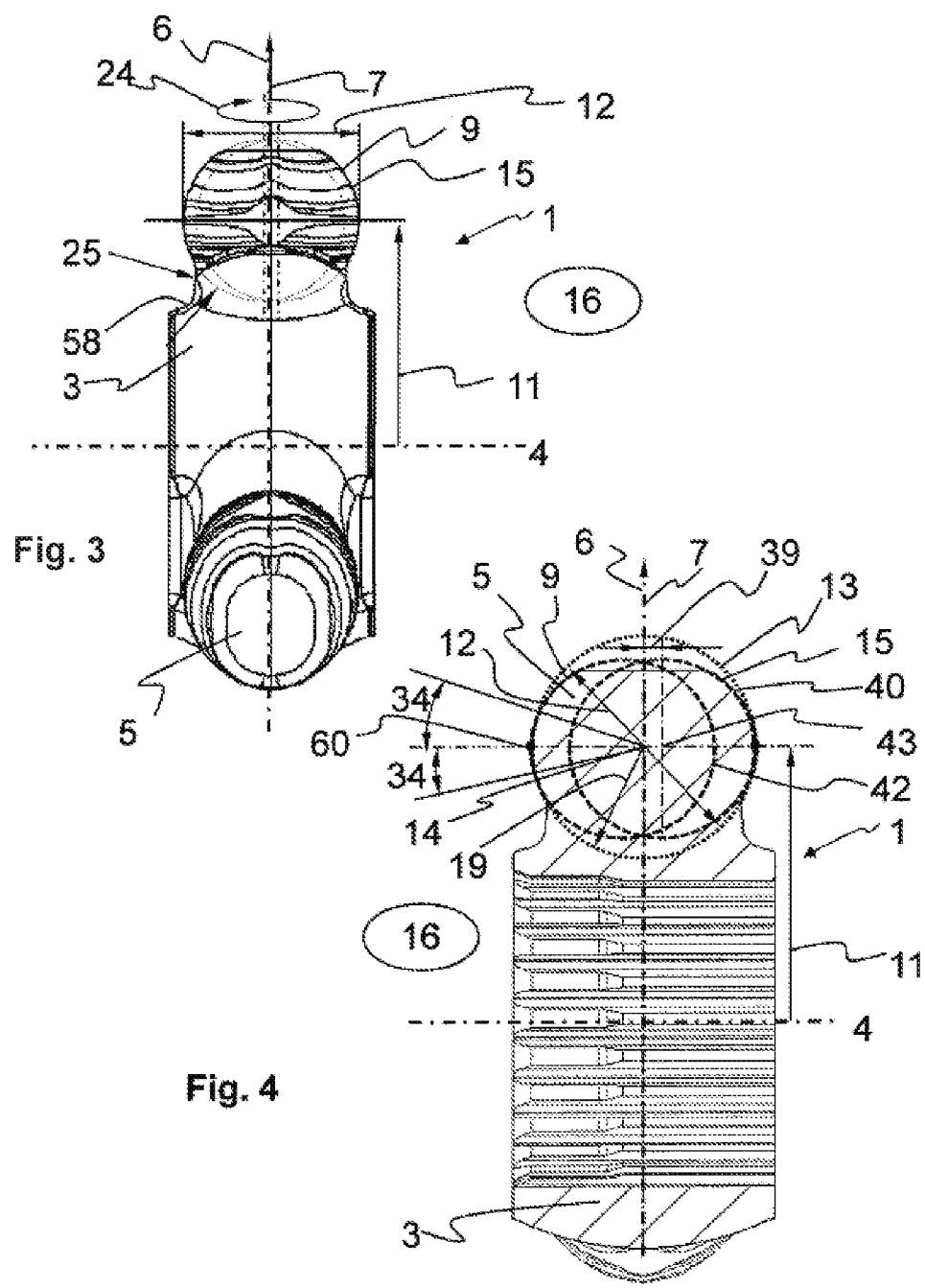

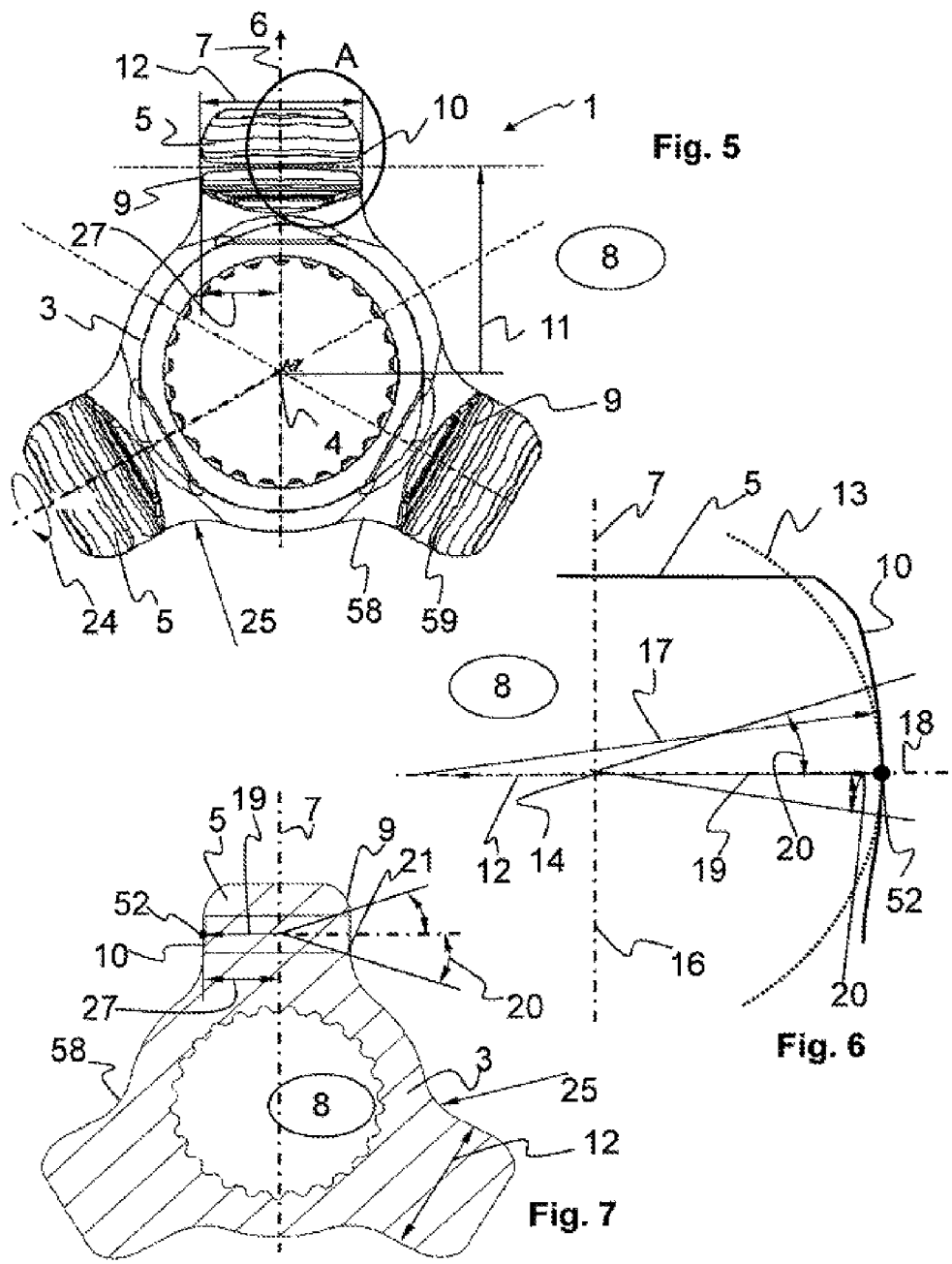

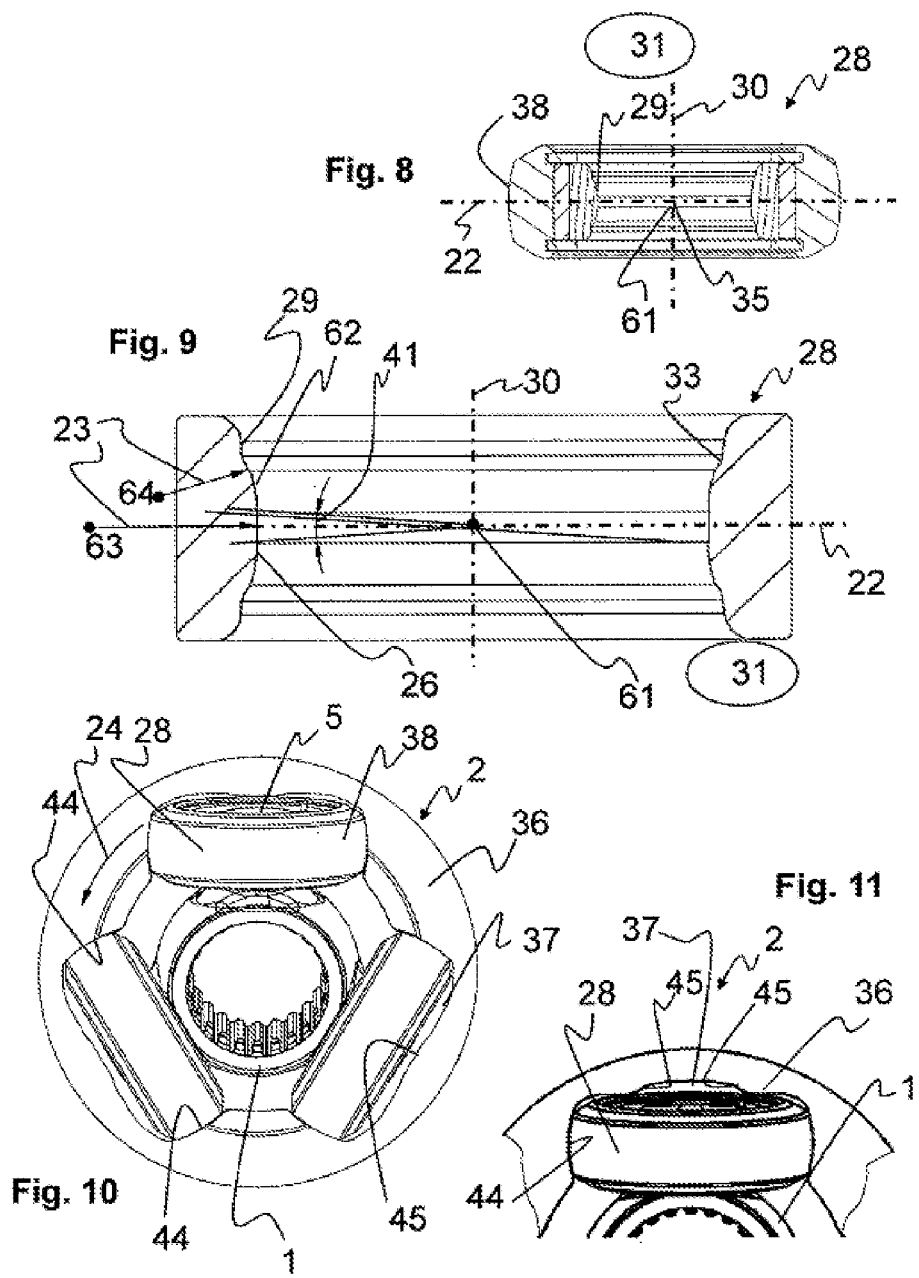

INNER JOINT PART AND ROLLER ELEMENT OF A TRIPOD CONSTANT VELOCITY JOINT

CROSS-REFERENCE TO RELATED APPLICATIONS

This application is a national stage of, and claims priority to, Patent Cooperation Treaty Patent Application No. PCT/EP2014/062897, filed on Jun. 18, 2014, which claims priority to German Application No. DE 10 2013 106 86835 filed on Jul. 1, 2013, each of which applications are hereby incorporated herein by reference in their entireties.

BACKGROUND

Tripod constant velocity joints are employed in particular for transmitting torques by shafts when axial displacement and deflection of the shafts in relation to one another is to be (simultaneously) enabled.

A tripod joint is disclosed in EP 1 008 777 A2, for example. There, inter alia, a projection which has a crowned circumferential face having a surface line which is assembled from a plurality of part-portions is disclosed, wherein the surface line in the region of the maximum diameter of the projection has a larger radius than in the adjacent portions of the surface line. The surface line here is embodied so as to be constant across the circumference of the crowned circumferential face, that is to say that the crowned circumferential face is embodied so as to be rotationally symmetrical in relation to the longitudinal axis of the respective projection. The projection of this tripod constant velocity joint thus deviates from the otherwise known spherical shape.

Proceeding therefrom, there is a need for a lightweight and cost-effective tripod constant velocity joint which moreover has a very good load capacity. Furthermore, said tripod constant velocity joint is to be employable also with comparatively large angles of deflection. For a tripod constant velocity joint of this type an inner joint part and a roller element are proposed.

SUMMARY

Disclosed herein is an inner joint part of a tripod constant velocity joint and an (adapted) roller element for disposal on a projection of an inner joint part of a tripod constant velocity joint. The tripod constant velocity joint is lightweight, cost-effective, has a very good load capacity, and is employable with comparatively large angles of deflection. For a tripod constant velocity joint of this type an inner joint part and a roller element are proposed.

This is achieved by an inner joint part of a tripod constant velocity joint as shown in the Figures. This is furthermore achieved by a roller element for an inner joint part. Further advantageous design embodiments are stated in this disclosure. The features which are individually listed in the claims may be intercombined in any technologically meaningful manner and may be complemented by explanatory facts of cases from the description, wherein further variants of embodiments of the invention will be demonstrated.

To this end an inner joint part of a tripod constant velocity joint, comprising a hub having a rotation axis and three projections, which outwardly extend from the hub in a radial direction, and have a transition region, which adjoins the hub, and a bearing region, is proposed. Each projection has a longitudinal axis and in the bearing region a crowned circumferential face. The inner joint part has a first plane which comprises all longitudinal axes of the projections and is defined so as to be perpendicular to the rotation axis. The crowned circumferential face of each projection forms a first surface line which runs in the first plane, wherein at a height along the longitudinal axis, at which a maximum diameter of the projection is present, an inner sphere having an inner sphere radius is predefined, the midpoint of said inner sphere lying on the longitudinal axis at the point of the height, and said inner sphere contacting the opposite contact points of the first surface line. The first surface line of each projection runs at least in first angular ranges which in each case are adjacent to the respective contact point and which are outside the inner sphere, wherein the first angular range emanates from the midpoint of the inner sphere and in each case extends to at maximum 20 angular degrees, in particular in each case to at maximum 10 angular degrees, to both sides of the respective contact point. A second surface line of the crowned circumferential face of each projection is present in a second plane, wherein the second plane is disposed so as to be perpendicular to the first plane and contains the longitudinal axis of the respective projection. Furthermore, the second surface line touches the inner sphere only at the height of the maximum diameter of the projection in the touch points, and runs at least in second angular ranges which in each case are adjacent to the respective touch point and which are within the inner sphere, wherein the second angular range emanates from the midpoint of the inner sphere and in each case extends to at maximum 30 angular degrees, in particular in each case to at maximum 20 angular degrees, to both sides of the respective touch point.

It may be assumed that the in-principle construction of an inner joint part of a tripod constant velocity joint is known, wherein the hub may in particular receive a shaft (rotating about the rotation axis) and thus may transmit an input torque via the projections to an outer joint part, or vice versa, respectively. The projections have functional regions which are readily apparent to a person skilled in the art, wherein typically a transition region which extends from the hub in a radial direction is provided, prior to being adjoined farther out by a bearing region of which the crowned circumferential face represents the sliding contact face for the roller element which is to be fitted thereonto. The circumferential face is embodied so as to be crowned, wherein the circumferential face is most often not spherically shaped. An end face, which is in particular characterized in that it is shaped so as to be perpendicular to the longitudinal axis or that the vectoral curvature radius of the end face is disposed in a cone which is disposed about the longitudinal axis and has an opening angle of 30 to 60 angular degrees, may form a radial terminal of the projection.

The longitudinal axes of the projections lie in a common plane which is positioned so as to be perpendicular to the rotation axis of the inner joint part and here is referred to as the "first plane". When a section through the projection in the first plane is now viewed, the contour of the circumferential face configures a "first surface line" (surface line of the projection in the first plane). This first surface line in the bearing region is functionally important, since a transmission of force in the circumferential direction of the inner joint part is performed by way of the former. Therefore, this surface line is also referred to for defining an inner sphere having an unequivocally determined inner sphere radius. To this end, the height of the projection having the maximum diameter (in terms of value) which is perpendicular to the longitudinal axis has to be identified first in the bearing region. Here, the maximum height is to be assumed, that is to say for the maximum diameter of the projection which lies farthest to the outside in the radial direction. The points of the opposite portions of the first surface line, which define the maximum diameter at this height, therefore are contact points of the imaginary, i.e., mathematically defined, inner sphere, wherein the midpoint of the inner sphere is positioned on the longitudinal axis, and the inner sphere radius corresponds to half the maximum diameter of the projection at the height of the longitudinal axis. The inner sphere which is referred to here for describing the contour of the projection serves in the comparison with a spherical shape of the projection from which the presently proposed embodiment correspondingly deviates.

In particular, the maximum diameter in the first plane may deviate from the maximum diameter of the projection in the second plane by a minor dimension (in the range from 0.01 to 0.1 millimeters), such that a cross section through the projection in a third plane is shaped in a slightly elliptical manner, wherein the third plane is oriented so as to be perpendicular to both the longitudinal axis of the respective projection as well as to the first plane.

Comparing the profile of the contour of the inner sphere in the first plane and of the first surface line adjacent to these contact points here results in that the first surface line is curved to a lesser extent, or runs outside the inner sphere (having a larger distance from the longitudinal axis), respectively. This determination should be present for corresponding first angular ranges (angular ranges referring to the first surface line), wherein the values of the first angular ranges may also be dissimilar, in particular with a view to the design embodiment below and above the height having the maximum diameter in the direction of the longitudinal axis (in the radial direction). In this way, the first angular range below the height may be embodied so as to be larger than, equal to, or smaller than the first angular range above the height. In the case of both first angular ranges being at maximum, both in each case encompass 20 angular degrees, such that in total 40 angular degrees are comprised. In the case of a first angular range being at minimum and another being at maximum, a first angular range (above or below the one contact point) then extends only across 20 angular degrees, while toward the other side (accordingly below or above the same contact point) the above condition does not have to be met. However, it is clear that the first surface line is to lie farther outside at least on one side, in particular across a (minimum) first angular range of 2 angular degrees on both sides of the contact point, in particular of at least 5 angular degrees.

The profile of the first surface line thus deviates from a spherical shape and in particular in the first plane extends in a flatter manner than the profile of the sectional circle of the inner sphere in the first plane. The circumferential forces between the inner joint part and the outer joint part of a tripod constant velocity joint are transmitted primarily in this first plane. As a result of the first surface line running in a flatter manner, the osculation between the projection surface in the bearing region and the inner circumferential face of a roller element becomes tighter. As a result of the first surface line running in a flatter manner, the Hertzian contact stress in the primary direction of force of the tripod constant velocity joint (in the first plane) may thus be considerably reduced. In this way, comparatively high forces may be transmitted by this tripod constant velocity joint, so that the projections may also be embodied having a maximum diameter which in terms of value is significantly smaller than is the case in known tripod constant velocity joints. On account thereof, comparatively small roller elements may be used, so that in consequence a reduction of the external dimensions of an outer joint part may be achieved. As a result of the tighter osculation between the roller element and the projection the NVH (noise, vibration, harshness) properties of the constant velocity joint are also improved, in particular in the case of angles of deflection of the inner joint part in relation to the outer joint part of in excess of 16 angular degrees. It is precisely in the case of such large angles of deflection that so-called "shuddering" or "start-up wobbling" which is attributable to the cyclical axial force of the $3^{rd}$ order arises in known joints during operation.

In a section through the longitudinal axis of each individual projection which is offset by 90 angular degrees in relation to the first plane, a corresponding contour of the crowned circumferential face, here is referred to as the "second surface line" (surface line in the second plane), becomes identifiable. Hereby, the profile is now compared again with the same inner sphere, that is to say with the sectional line of the inner sphere in the second plane (in particular at the same height of the longitudinal axis). Here, the inner sphere also touches the second surface line at two points which are opposite one another in relation to the longitudinal axis and which here are referred to as touch points. Thus (only) the touch points of the second surface line and the contact points of the first surface line lie on a common circle of the inner sphere. Comparing the profile of the contour of the inner sphere in the second plane with the second surface line adjacent to these touch points results in that the second surface line is more heavily curved, or runs within the inner sphere (having a smaller distance from the longitudinal axis). This determination should be present for corresponding second angular ranges (angular ranges referring to the second surface line), wherein the values of the second angular ranges may also be dissimilar, in particular with a view to the design embodiment above and below the height with the maximum diameter in the direction of the longitudinal axis. To this extent reference is made to the corresponding narrative relating to the first angular range, which here is to equally apply to the second angular range.

The profile of the second surface line in the second plane, which therefore now runs within the inner sphere, in particular enables a minor play to be adjusted between the roller element and the projection, so that the center of the roller element in the second plane is displaceable in relation to the projection when the joint is deflected. As a result of this potential displacement it may be avoided that jamming between the projection and the roller element in the region of the first surface line arises when the joint is deflected and a tilt movement of the roller element in relation to the projection is performed. This potential jamming is a result of the profile of the first surface line which here is formed by the large first curvature radius (or by a straight line, respectively). Accordingly, a plurality of contact points with the inner circumferential face of the roller element may be configured on one side of the projection in the region of the first surface line, so that jamming would be possible. The profile of the second surface line now ensures that displacement between the projection and the roller element is possible, so that jamming is positively prevented.

In particular, it is now enabled by the profile of the second surface line that contact between the second surface line of the projection and the roller element arises only on one side of the projection when the joint is deflected. This may be traced back in particular to the projection radius in this contact region with the roller element being smaller than the inner sphere radius. In this way the center of the roller element (the center point of the roller element) in the case of large angles of deflection may be displaced in relation to the midpoint of the projection and along the second plane. On account thereof, the play between the roller element and the projection (in the region of the first surface line) may be minimized without jamming arising at large angles of deflection.

In particular, the transition between the second surface line and the first surface line in the circumferential direction about the longitudinal axis of each of the projections runs in a continuous manner. "Continuous" here means that no abrupt changes in the contour of the surface lines or on the circumferential face, respectively, are provided.

In particular, the projection has no circumferential face which is rotationally symmetrical about the longitudinal axis. The profile of the first surface lines in the first plane (primary direction of force) differs from the profile of the second surface lines in the second plane, in particular adjacent to the contact points or to the touch points with the inner sphere, respectively. The first surface lines and the second surface lines are in each case adapted to the various stresses during operation. During operation circumferential forces are largely transmitted by those regions of the circumferential face of the projection that are disposed in the region of the first plane. The (significantly lower) forces which act in the axial direction of the constant velocity joint are transmitted by way of those regions of the circumferential face of the projection that are disposed in the second plane. On account of these axially acting forces the inner joint part is displaced in relation to the outer joint part in the axial direction.

In particular, the first surface line in the bearing region has a first curvature radius which is at maximum at least at the contact point. By way of this maximum first curvature radius (in terms of value) the (deviating) profile of the first surface line in relation to the inner sphere will now be defined. The inner sphere has the maximum diameter of the projection or of an inner sphere radius, respectively, which is (considerably) smaller than the first curvature radius of the first surface line. This applies in particular at least to the first angular range adjacent to the contact point and/or to the contact point per se.

In particular, a ratio (V1) of the value of the first curvature radius (eKRmax) in the contact point to the value of the inner sphere radius (IKR) is at least 50 (V1=eKRmax/IKR≥50). Preferably, the ratio is in a range from 100 to 1000 (100≤V1≤1000). In this case, the osculation which has already been described above is particularly well achieved.

Enlarging the first curvature radius reduces the contact pressure between the roller element and the projection in a corresponding manner (good osculation). Here, values in a range from 50 to 1000 permit a good compromise between a necessary play without jamming and the resulting lower contact pressure (Hertzian contact stress).

According to one example the first surface line of each projection at the contact points and in first angular ranges which are in each case adjacent thereto is embodied as a straight line, wherein the first angular range emanates from the midpoint of the inner sphere and at least on one side extends so as to be adjacent to the contact point by 2 to 20 angular degrees.

In particular, the first surface line thus extends in the manner of a portion of a straight line (i.e., first curvature radius is infinitely large) across a portion which lies within the first angular range, wherein the portion of the straight line does not inevitably have to be configured on both sides of the contact point and/or uniformly on both sides of the contact point. Rather, it is sufficient that a portion of 2 to 20 angular degrees is encompassed, wherein the portion of the straight line very particularly preferably extends across 5 to 20 (very particularly preferably 5 to 10) angular degrees and beyond the contact point. It is furthermore preferable that the portion of the straight line, or the first angular range, respectively, here is configured so as to be (predominantly or indeed only) above the contact point (that is to say toward the end face of the projection). In particular, it is possible for the first surface line to intersect the inner sphere outside the first angular range and to then run within the inner sphere.

In particular, the circumferential face of each projection in the third plane in the region of the first surface line is formed by the first curvature radius. Furthermore, the circumferential face of each projection in the third plane and in a fourth angular range between the first plane and the respective second plane of the projection is formed by a second curvature radius which is continuously varied.

According to a further example, each projection in the transition region configures a transition radius the value of which in a circumferential direction about the longitudinal axis of the projection is varied, wherein the values of the transition radius in the first plane are at maximum and in the circumferential direction are at minimum and offset thereto by 90 angular degrees. The transition region in relation to the bearing region is typically configured so as to taper off, wherein it is predefined here in which regions of the transition region more or less material may be removed, respectively, such that a better result in terms of weight savings while at the same time providing high load transmission and durability is enabled. In particular, the transition radius between the maximum value and the minimum value is varied in a continuous manner, that is to say that no abrupt transitions in the circumferential direction are provided. On account of this design embodiment of the transition radius across the circumference of the projection, in particular having the minimum value in the second plane of each projection, a relief groove and/or a cut-out in the projection into which part of the roller element may also plunge in the case of deflection of the tripod constant velocity joint may be provided, so that a collision between the roller element and the inner joint part may be avoided even in the case of large angles of deflection. On account thereof, comparatively large angles of deflection of the inner joint part in relation to the outer joint part may also be enabled without the outer diameter of the tripod joint having to be enlarged (that is to say the outer diameter of the outer joint part).

In particular, the described cut-outs permit the outer diameter of a tripod joint having a comparable function to be able to be reduced by up to 5%.

Optionally, the profile of this transition in the second plane of each projection is only approximately defined by the transition radius. The contour of the projection in this transition region may optionally run in a jerky manner and/or have a plurality of dissimilar radii. A person skilled in the art may readily apply this teaching here in a corresponding manner.

In particular, a ratio (V2) of the maximum value of the transition radius (URmax) to the minimum value of the transition radius (URmin) is in a range from 5 to 10 (V2=URmax/URmin; 5≤V2≤10). In particular, this ratio is in a range from 8 to 10 (8≤V2≤10).

In particular, the maximum possible transition radius is to be disposed at that point where the highest bending stress arises. A comparatively large transition radius minimizes notch stressing. The upper limit results from optimizing the construction size, the maximum angle of deflection of the joint, and the strength of the roller element.

In particular, in order for a minimum height of the transition region and thus of a maximum functional region to be implemented on the projection for the roller element to be tilted, the smallest transition radius is disposed so as to be orthogonal to the region of force introduction, this means here in the region of the second plane.

It is further proposed that the first surface line of each projection in a region between the contact point and the hub has a spacing from the longitudinal axis of the projection which corresponds to at least the inner sphere radius. In other words, this means in particular that the first surface line of the projection in a region between the contact point and the hub (in particular at least partially [only] in the transition region) has a spacing from the longitudinal axis of the projection which substantially corresponds to the inner sphere radius. In particular, the first surface line, emanating from the contact point and toward the hub, thus continues in the form of a straight line which runs parallel with the longitudinal axis of the projection.

According to one further aspect of the invention, a roller element of a tripod constant velocity joint which is optionally also combinable with the inner joint part which has been discussed here, is proposed.

The roller element of a tripod constant velocity joint has a center and an outer circumferential face and a convex-shaped inner circumferential face which are configured so as to be rotationally symmetrical about a central axis. Furthermore, a median plane which includes a central axis of the roller element and defines a profile line of the convex inner circumferential face is present. The profile line configures a profile line radius of which the value is at maximum in a central region about a central plane which is disposed so as to go through the center and to be perpendicular to the median plane, wherein the value of the profile line radius is smaller in an adjacent region.

The in-principle construction of such roller elements is known to a person skilled in the art. Typically, such a roller element comprises an inner bearing ring and an outer bearing ring, wherein needle-shaped rolling elements are interdisposed therebetween. The convex-shaped inner circumferential face here is typically formed by the inner bearing ring, and the outer circumferential face is formed by the outer bearing ring. The inner bearing ring has an opening which is designed such that the roller element may be push-fitted on the projection of the associated tripod constant velocity joint and may interact with the bearing face provided thereon. Typically, the center axis here represents the rotation axis for the roller element, the center thus also lying on said rotation axis. A central plane which intersects the roller element centrically and perpendicularly to a median plane (which encloses the central axis) runs through the center.

In particular, the inner circumferential face or the profile line, respectively, continues outside this convex portion by way of a concave or straight portion (or a combination thereof).

During operation of the tripod constant velocity joint in particular both regions of the convex-shaped inner circumferential face (that is to say the central region and the adjacent region having a comparatively small profile line radius) may come into contact with the circumferential face of the projection. The shape of the inner circumferential face of the roller element permits in particular that the high loads which generally arise frequently in the case of small angles of deflection are transmitted via the central region, having a good osculation. The minor loads which usually arise in the case of comparatively large angles of deflection may be transmitted via a somewhat poorer osculation in the adjacent region. On account of this special shape of the convex inner circumferential face, it is now possible in particular for the osculation between the roller element and the projection to be adapted to the respective loading situation and at the same time for a slight play between the roller element and the projection to be implemented, so that the risk of the roller element jamming on the projection does not exist.

In particular, a ratio (V3) of the maximum value of the profile line radius (VLRmax) to the smaller value of the profile line radius (VLRred) is at least 2 (V3=VLRmax/VLRred; V3≥2). Very particularly preferably, the ratio is in a range from 3 to 6 (3≤V3≤6).

It has been demonstrated here that a good compromise between contact pressure, play and tilting capability of the roller element on the projection results here within these limits.

According to one further example, the central region comprises a third angular range which emanating from the center extends beyond the central plane to both sides thereof by at minimum 1 angular degree and at maximum 6 angular degrees. Very particularly preferred limits of the third angular range are: ±1.5 angular degrees to ±2.5 angular degrees (that is to say symmetrical above and below the central plane). Overall, the third angular range should thus preferably comprise 2 to 12 angular degrees, in particular 3 to 5 angular degrees. In particular, the profile line of the inner circumferential face, which is in each case formed by the smaller profile radius, extends in each case across a (wider) angular range, so as to emanate from the center and on both sides (that is to say symmetrical above and below the central plane) so as to in each case adjoin the third angular range, said angular range being from ±1 to ±6 angular degrees, in particular from ±1.5 to ±2.5 angular degrees.

The mentioned values for the third angular range and the further angular range are in particular advantageous for joint angles of deflection of up to 6 or 10 angular degrees (Hertzian contact stress in the loading range which is relevant to the service life of the tripod constant velocity joint), respectively, at the same time considering the tilting capability of the roller element, that is to say the tilt angle range of up to 10 angular degrees (in relation to the centric plane of the clearance in the outer joint part).

The roller element in particular has a convex-shaped and crowned outer circumferential face, wherein tilting of the roller element in relation to the outer joint part is enabled therewith within a guide track (clearance) of the outer joint part.

The invention furthermore relates to a tripod constant velocity joint which comprises at least an inner joint part as described herein, a rotatably mounted roller element according to the invention on each projection, and an outer joint part having axially running clearances for guiding in each case one roller element along an axial direction. It is provided here that opposite regions of the second surface lines of each projection, which during operation are in contact with the convex inner circumferential faces of the roller elements, in each case form one segment of a contour circle, the circle centers of said segments in each case being disposed at a distance from the longitudinal axis of the projection, wherein a ratio of the distance to the inner sphere radius having a value of 0.02 to 0.38 applies.

In other words, this means that the opposite portions of the second surface lines (in particular going beyond the contact points) are shaped in the manner of an arc segment, wherein the arc segments here are configured so as to be mirror symmetrical in particular in relation to the longitudinal axis of the projection. Superimposed thereon, so-called contour circles may be formed in the second plane, the circle center of said contour circles not being positioned on the longitudinal axis but distanced therefrom somewhat so as to be perpendicular to the longitudinal axis, such that a type of "offset" is formed. Here, the ratio (V4) of the distance (D) from the inner sphere radius (IKR) having a value of 0.02 to 0.38 (V4=D/IKR; 0.02≤V4≤0.38) applies. This is to say that it applies in particular for the second surface line that the two contour circles in each case have a smaller contour circle radius than the inner sphere has an inner sphere radius.

Establishing a lower limit (here V4=0.02) serves to ensure that no jamming arises when the tripod constant velocity joint is deflected and there is minor play between the roller element and the projection (in the region of the first surface line). Establishing the upper limit limits the play between the roller element and the projection (in the region of the second surface line) to a low value, said play arising in a cyclical manner when the tripod constant velocity joint is deflected. On account thereof, NVH issues during load alternation are avoided.

Further, to this end, the first surface lines can be in each case formed in portions which are in each case offset by 90 angular degrees in the circumferential direction and which come into contact with the convex inner circumferential faces of the roller elements, such that contour circles having a considerably larger contour circle radius or even an infinitely large contour circle diameter (in the manner of a portion of a straight line) may be formed there.

Furthermore, an embodiment of a tripod constant velocity joint comprising at least an inner joint part as described herein, a rotatably mounted roller element according to the invention on each projection, and an outer joint part having axially running clearances for guiding in each case one roller element along an axial direction is proposed. It is provided here that the clearances have a pair of axially running guide faces on which the roller elements are supported in a circumferential direction, wherein at least one support face which limits a tilt movement of the roller elements about a tilt axis is disposed between the pair of guide faces, and wherein the tilt axis of the roller elements is formed by the intersection line of the central plane of the roller element and the centric plane of the guide faces which runs parallel with the joint axis of the outer joint part.

In particular, two supporting faces which in each case are disposed so as to be adjacent to the guide faces are provided. In particular, the support faces here are configured so as to be eccentric between the guide faces.

The in particular crowned outer circumferential face of the roller elements enables that the roller element may perform a (low-friction) tilt movement in the axially running clearances of the outer joint part. The guide faces in the clearances of the outer joint part are adapted to this shape of the roller elements. In this way, the tilt angle of the projection that is required for the respective angle of deflection of the tripod constant velocity joint in relation to the roller element may be reduced, because the roller element conjointly with the inner joint part in relation to the outer joint part performs a tilt movement in the identical direction. This reduction in the tilt movement may avoid contact between the roller element and the inner joint part, in particular in the region of the transition radius having a minimum value, such that comparatively large angles of deflection between the inner joint part and the outer joint part may be implemented. Limiting the tilt movement of the roller element by way of the support face is provided also in particular so that the roller element does not become wedged in the axially running clearances of the outer joint part when the inner joint part is heavily deflected in relation to the outer joint part.

The support faces which run in the axial direction extend across a predefined depth of the clearance (in the circumferential direction) and in each case in the radial direction inwardly toward the inner joint part of the tripod constant velocity joint. In particular, the support faces are formed by the material of the outer joint part, and are thus integrated in the outer joint part.

The at least one support face may be disposed such that the roller elements are tiltable about the tilt axis by a tilt angle range of at maximum 10 angular degrees. In particular, the tilt angle range is at maximum ±10 angular degrees (about a normal position), in particular at maximum ±6 angular degrees about the tilt axis.

These limits for the tilt angle range result in an advantageous compromise for maximum angles of deflection and good NVH properties. Thus, cyclical axial forces of the $3^{rd}$ order and high-frequency displacement forces may be minimized.

The following advantageous (approximate) values may be stated in an exemplary manner for a tripod constant velocity joint having a nominal torque of 3300 Nm [Newton meters]:
  Outer diameter of outer joint part: 82 mm
  PCR (pitch circle radius—spacing of the median plane of the respective guide faces from the joint axis of the outer joint part): 24 to 25 mm
  Height: 23 to 26 mm
  Transition radius (maximum value): 9 mm
  Transition radius (minimum value): 1.5 mm
  First curvature radius in the contact point (eKRmax): 4831.40 mm
  Inner sphere radius (IKR): 9.59 mm
  Distance: 2.02 mm
  Radius of contour circle (IKR distance): 7.57 mm In particular, it is proposed that the height of the maximum diameter of each projection in relation to the PCR is offset by +1 mm to −1 mm. On account of this offset the profile of the axial force of the $3^{rd}$ order may likewise be influenced. In particular, the height of the maximum and of the minimum as well as the position of the maximum and of the minimum may be influenced in the profile of the axial force of the $3^{rd}$ order so as to depend on the angle of deflection (cf. FIG. 15: maximum at 7.5 angular degrees and minimum between 15 and 17.5 angular degrees of angle of deflection).

A fourth angular range of in each case 90° extends in the third plane of each projection, in each case between the first plane and the second plane. The profile of the circumferential face of the projection, emanating from the rotation axis along the radial direction, is in each case formed by a surface line. This surface line, at least in the intersection point between the third plane, the circumferential face of the projection, and an angular value within the fourth angular range, is in each case formed by a second curvature radius (KR), and the profile of the surface line of the circumferential face along the radial direction is thus defined. The value of this second curvature radius, along the fourth angular range emanating from the first curvature radius of the first surface line in the region of the first plane, is continuously varied. The respective curvature radius is referred to as KR. An angular value of 0° is in each case present in the second plane. An angular value of 90° is in each case present in the first plane. This means that at an angular value of 0° the curvature radius of the second surface line defines the profile of the circumferential face of the projection along the radial direction. This (second) curvature radius of the second surface line substantially corresponds to the inner sphere radius minus the distance. In the case of an angular value of 90° the profile of the circumferential face is defined by the first curvature radius of the first surface line. The following values for the (second) curvature radii may be assumed for the exemplary tripod constant velocity joint having the nominal torque of 3300 Nm, as stated above (see Table 1):

TABLE 1

| Angular value ° [Angular degrees] | (second) Curvature radius (KR) mm [millimeter] | V1 = KR/IKR | Remarks |
|---|---|---|---|
| 0 | 7.59 | 0.79 | approx. IKR distance |
| 5 | 7.81 | 0.81 | |
| 10 | 8.03 | 0.84 | |
| 15 | 8.25 | 0.86 | |
| 20 | 8.47 | 0.88 | |
| 25 | 8.70 | 0.91 | |
| 30 | 8.92 | 0.93 | |
| 35 | 9.14 | 0.95 | |
| 40 | 9.36 | 0.98 | |
| 45 | 9.59 | 1.00 | IKR |
| 50 | 9.86 | 1.03 | |
| 55 | 10.27 | 1.07 | |
| 60 | 11.16 | 1.16 | |
| 65 | 13.16 | 1.37 | |
| 70 | 17.89 | 1.87 | |
| 75 | 30.98 | 3.23 | |
| 80 | 79.68 | 8.31 | |
| 85 | 383.17 | 39.98 | |
| 90 | 4831.40 | 504.06 | eKRmax |

In particular, it is proposed that the inner joint part, the roller element, and/or the tripod constant velocity joint are/is employable in a motor vehicle. These components serve in particular for connection purposes and for transmitting torques from a drive unit to the wheels of a motor vehicle. This is performed either in combination with a longitudinal shaft or with shafts which are disposed so as to be transverse to a vehicle axis, that is to say with side shafts.

SUMMARY OF THE DRAWINGS

The invention as well as the general technical field will be discussed in more detail below by the figures. The figures show exemplary embodiments to which the invention is not limited, however. In particular, it is to be pointed out that the figures and in particular the proportions illustrated are only schematic. Same reference signs refer to same items in the figures in which:

FIG. 1 shows a motor vehicle;
FIG. 2 shows an inner joint part;
FIG. 3 shows an inner joint part in a side view;
FIG. 4 shows an inner joint part according to FIG. 3, in a sectional view;
FIG. 5 shows an inner joint part in a view along the rotation axis;
FIG. 6 shows a detail A of FIG. 5;
FIG. 7 shows an inner joint part according to FIG. 5, in the cross section;
FIG. 8 shows a roller element;
FIG. 9 shows a component of the roller element according to FIG. 8;
FIG. 10 shows a tripod constant velocity joint in a perspective view;
FIG. 11 shows a detail of a tripod constant velocity joint in a perspective view.

DESCRIPTION

Figure 12:
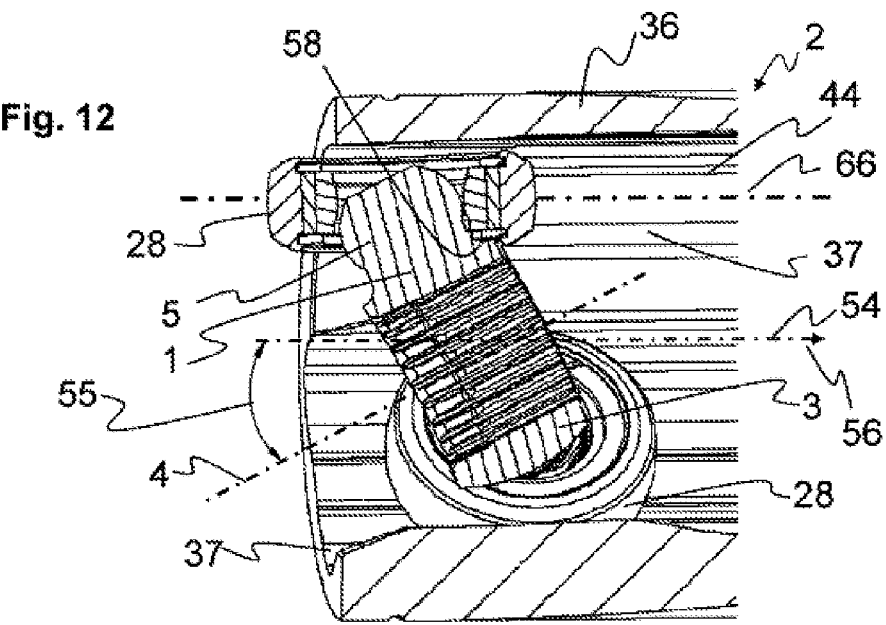
FIG. 12 shows a tripod constant velocity joint in a sectional side view.

FIG. 1 shows a motor vehicle 51 having a drive unit 65 and wheels 57. Torques which are generated by the drive unit 65 are transmitted via shafts 50 and tripod constant velocity joints 2 or other types of joint to the wheels 57. In particular, the tripod constant velocity joints 2 which are described herein are employable in side shaft assemblies 49 in which comparatively large angles of deflection typically arise.

FIG. 2 shows an inner joint part 1 of a tripod constant velocity joint 2, comprising a hub 3 having a rotation axis 4 and three projections 5, which outwardly extend from the hub 3 in a radial direction 6, including first a transition region 58, then a bearing region 59, and finally an end face 32. Each projection 5 has a longitudinal axis 7 and a crowned circumferential face 9 in the bearing region 59. The longitudinal axes 7 collectively define a first plane 8 which is perpendicular to the rotation axis 4. A second plane 16 is disposed so as to be perpendicular to the first plane 8 and comprises in each case the longitudinal axis 7 of a single projection 5. A third plane 18 runs perpendicularly to the first plane 8 and to the second plane 16, wherein a maximum diameter 12 of the projection 5 is disposed in this third plane 18.

FIG. 3 shows an inner joint part 1 in a side view, wherein emanating from the hub 3, three projections 5 outwardly extend in the radial direction 6. The crowned circumferential face 9 of the projection 5 in the second plane 16 (here parallel with the plane of the illustration) is formed by a second surface line 15. The projection 5 has a maximum diameter 12 which emanating from the rotation axis 4 in the radial direction 6 is disposed at a height 11. A transition radius 25 which here is embodied at a minimum value in the second plane 16 is provided between the projection 5 and the hub 3. It can be seen that the projection 5 in the second plane 16 and emanating from the maximum diameter 12 (along the second surface line 15) tapers off further toward the hub 3. The transition region 58 adjoins this taper toward the hub 3. A relief groove, into which a roller element 28 (not illustrated here) which is disposed on the projection 5 can plunge without contacting the inner joint part 1 in the case of a tilt movement of the roller element 28, is configured below the transition radius 25 in the direction of the rotation axis 4 of the inner joint part 1. In particular, a ratio (V2) of the maximum value of the transition radius 25 (URmax) to the minimum value of the transition radius 25 (URmin) is in a range from 5 to 10 (V2=URmax/URmin; 5≤V2≤10). In particular, this ratio is in a range from 8 to 10 (8≤V2≤10). The maximum possible transition radius 25 is to be disposed at that point where the highest bending stress arises. A comparatively large transition radius 25 minimizes notch stressing. The upper limit results from optimizing the construction size, the maximum angle of deflection of the joint, and the strength of the roller element 28.

FIG. 4 shows the inner joint part 1 according to FIG. 3 in the cross section. The projection 5 at the height 11 has a maximum diameter 12 which corresponds to the diameter of an inner sphere 13 (illustrated with dotted lines). In the second plane 16 which is shown here, the circumferential face 9 of the projection 5 is formed by a second surface line 15. This second surface line 15 emanating from the maximum diameter 12 at the height 11 extends outwardly in the radial direction 6, within the inner sphere 13. The profile of the second surface line 15 may be approximated by the segments 40 of two contour circles 42 (illustrated with dashed lines), the circle centers 43 of which are disposed at the height 11, in each case at a distance 39 from the longitudinal axis 7. The circle centers 43 are thus at a distance 39 from the midpoint 14 of the inner sphere 13. While the inner sphere 13 has a maximum diameter 12 and thus an inner sphere radius 19, the second surface line 15 is at least partially generated by the segments 40 of the contour circles 42, so as to have a relatively small radius, the latter corresponding to the inner sphere radius 19 minus the distance 39. It is provided here that opposite regions of the second surface lines 15 of each projection 5, which during operation are in contact with the convex inner circumferential faces 9 of the roller elements 28, in each case form one segment 40 of a contour circle 42, the circle centers 43 of said segments 40 in each case being disposed at a distance 39 from the longitudinal axis 7 of the projection 5, wherein a ratio of the distance 39 to the inner sphere radius 19 having a value of 0.02 to 0.38 applies. Here, the ratio (V4) of the distance 39 (D) from the inner sphere radius 19 (IKR) having a value of 0.02 to 0.38 (V4=D/IKR; $0.02 \leq V4 \leq 0.38$) applies. This is to say that it applies in particular for the second surface line 15 that the two contour circles 42 in each case have a smaller contour circle 42 radius than the inner sphere 13 has an inner sphere radius 19.

In particular, the second surface line 15 also runs in a region between the height 11 and the hub 3, at least partially within the inner sphere 13.

FIG. 5 shows an inner joint part 1 in a plan view along the rotation axis 4. Emanating from the hub 3, three projections 5 in each case extend along a longitudinal axis 7 in the radial direction 6. In the first plane 8 (parallel with the plane of illustration) the circumferential face 9 of the projections 5 is formed by a first surface line 10. In the bearing region 59 at the height 11, emanating from the rotation axis 4 along the longitudinal axis 7 of each of the projections 5 in radial direction 6, the projection 5 has a maximum diameter 12. Emanating from this maximum diameter 12, the projection 5 tapers off outwardly along the first surface line 10 in the radial direction 6. A maximum transition radius 25 is provided between the projection 5 and the hub 3, in the transition region 58. It can be seen here that the first surface line 10, emanating from the height 11 and in the direction of the hub 3, has an almost constant spacing 27 from the longitudinal axis 7, which spacing 27 substantially corresponds to the inner sphere radius 19 (not shown here) and thus to half the maximum diameter 12. Emanating from this spacing 27, the projection 5 exclusively widens in the transition region 58 and up to the hub 3. A relief groove or a cut-out, as is shown in the second plane 16 in FIGS. 2 and 3, has not been implemented here. In this first plane 8 the tilt movement of the roller element 28 (not shown here) in relation to the projection 5 is performed to a far lesser extent than in the second plane 16. The transition region 58 having the maximum transition radius 25 now enables the projection 5 to have no (or only a very minor) taper between the hub 3 and the height 11 in this first plane 8. In this way, high circumferential forces and thus high torques may be transmitted, wherein also smaller construction sizes of the tripod constant velocity joints 2 than previously usual may be employed, which then likewise achieve a long service life.

FIG. 6 shows a detail A of FIG. 5. The projection 5 is shown in the first plane 8 (plane of illustration). The first surface line 10 in the first plane 8 runs outside the indicated inner sphere 13 and contacts this inner sphere 13 by way of the inner sphere radius 19 in the region of the contact point 52. The projection 5 has its maximum diameter 12 in this contact point 52. The third plane 18 extends so as to be transverse to the first plane 8 and through the contact point 52 and across the maximum diameter 12. The midpoint 14 of the inner sphere 13 lies on the third plane 18 and in the intersection point with the second plane 16 as well as with the first plane 8. The first surface line 10 in the region of the contact point 52 has a maximum first curvature radius 17 which is present in the first angular ranges 20 which lie on both sides adjacent to the contact point 52. The first curvature radius 17 can be at maximum at least at the contact point 52. In particular, a ratio (V1) of the value of the first curvature radius 17 (eKRmax) in the contact point 52 to the value of the inner sphere radius 19 (IKR) is at least 50 (V1=eKRmax/IKR$\geq$50). Preferably, the ratio is in a range from 100 to 1000 ($100 \leq V1 \leq 1000$).

To this end an inner joint part 1 of a tripod constant velocity joint 2, comprising a hub 3 having a rotation axis 4 and three projections 5, which outwardly extend from the hub 3 in a radial direction 6, and have a transition region 58, which adjoins the hub 3, and a bearing region 59, is proposed. Each projection 5 has a longitudinal axis 7 and in the bearing region 59 a crowned circumferential face 9. The inner joint part 1 has a first plane 8 which comprises all longitudinal axes 7 of the projections 5 and is defined so as to be perpendicular to the rotation axis 4. The crowned circumferential face 9 of each projection 5 forms a first surface line 10 which runs in the first plane 8, wherein the projection 5 has a height 11 along the longitudinal axis 7, the height 11 having an end point where the projection 5 has a maximum diameter 12, and the projection 5 defines an inner sphere 13 having an inner sphere radius 19 and a midpoint 14 on the longitudinal axis 7 at the end point of the height 11. The inner sphere 13 contacts opposite contact points 52 of the first surface line 10. The first surface line 10 of each projection 5 extends at least past an arc defined by respective first angular ranges 20, wherein the first angular ranges 20 are adjacent to the respective contact point 52 and are outside the inner sphere 13, wherein each first angular range 20 emanates from the midpoint 14 of the inner sphere 13 and extends to at maximum 20 angular degrees, in particular in each case to at maximum 10 angular degrees, to both sides of the respective contact point 52. The first surface line 10 can intersect the inner sphere 13 beyond the first angular range 20.

A second surface line 15 of the crowned circumferential face 9 of each projection 5 is present in a second plane 16, wherein the second plane 16 is perpendicular to the first plane 8 and contains the longitudinal axis 7 of the respective projection 5. Furthermore, the second surface line 15 touches the inner sphere 13 only at the height 11 of the maximum diameter 12 of the projection 5 in touch points 60, and extends at least within a second arc defined by respective second angular ranges 34, wherein the second angular ranges 34 are adjacent to the respective touch point 60 and are within the inner sphere 13, wherein each second angular range 34 emanates from the midpoint 14 of the inner sphere 13 and extends to at maximum 35 angular degrees, in particular in each case to 20-30 angular degrees, to both sides of the respective touch point 60.

FIG. 7 shows the inner joint part 1 according to FIG. 5 in a sectional view. The projection 5 in the first plane 8 (plane of illustration) is limited by the first surface line 10. The latter in the region of the maximum diameter 12 has a straight line 21 which extends across first angular ranges 20. The angular ranges 20 enclose the contact point 52. The regions of the first surface line 10, which during operation of the tripod constant velocity joint 2 contact the inner circumferential face 29 of a roller element 28, here are formed by opposite portions of straight lines (contour circles having an infinitely large radius). The dashed lines on the upper projection 5 highlight that the portions of the straight line are mutually opposite and highlight the extent of the straight line 21 along the first surface line 10.

The transition region 58 is disposed between the contact point 52 and the hub. The first surface line 10 now continues between the contact point 52 toward the hub 3 at a (constant) spacing 27 and so as to be substantially parallel with the longitudinal axis 7. The transition region 58 is formed by the maximum transition radius 25, wherein there is no tapering of the projection 5 here, in particular.

FIG. 8 shows a roller element 28 which is disposed on one of the projections 5 (not shown here). The roller element 28 here is formed by a plurality of individual components, wherein the roller element 28 has an outer circumferential face and an inner circumferential face 29. The outer circumferential face 38 is in contact with the outer joint part (not shown here), and the inner circumferential face 29 is in contact with the crowned circumferential face 9 of the projection 5. A median plane 31 (plane of illustration) which encompasses the central axis 30, as well as a central plane 22 which is disposed centrically thereto, may be fixed in relation to the roller element 28, wherein the intersection point 35, composed of the central axis 30 and of the central plane 22, forms the center 61 of the roller element 28. The roller element 28 has a shape which is rotationally symmetrical about the central axis 30 and is embodied so as to be substantially mirror symmetrical about the central plane 22.

FIG. 9 shows a component of the roller element 28 according to FIG. 8, in a sectional view in the median plane 31 (plane of illustration), wherein the inner circumferential face here is shown in detail. The convex-shaped inner circumferential face 29 is configured so as to be rotationally symmetrical about a central axis 30, wherein the roller element is constructed so as to be substantially symmetrical in relation to the central plane 22 which runs perpendicularly to the central axis 30. The profile line 33 of the convex-shaped inner circumferential face 29 has variable profile radii 23 and in the region of the central plane 22 (central region 26) and within a third angular range 41, which emanating from the center 61 extends on both sides beyond the central plane 22, is formed by a maximum profile line radius 63 and, in continuation thereof (in the adjacent region 62), by in each case at least one profile line radius 64 which in terms of value is comparatively small. In continuation of the respective comparatively small profile line radius 64, a portion having a concave-shaped profile line 33 of the inner circumferential face 29, which is adjoined again by a convex-shaped portion, can be seen here.

That part of the inner circumferential face 29 that during operation of a tripod constant velocity joint 2 is now in contact with the projection 5 of a inner joint part 1 (according to the invention) is formed by the convex inner circumferential face 29 having the maximum profile line radius 63 and the respective adjoining comparatively small profile line radii 64.

The inner circumferential face 29 which is formed by the maximum profile line radius 63 extends across a third angular range 41, emanating from the center 61 over the central plane 22 by ±1 angular degree to ±6 angular degrees, in particular by ±1.5 to ±2.5 angular degrees. In particular, the third angular range 41 also has a range from 2 to 12, in particular from 3 to 5 angular degrees. Furthermore, the profile line 33 of the inner circumferential face 29, which is in each case formed having the comparatively small profile radii 64, emanating from the center 61 and on both sides (that is to say symmetrically above and below the central plane 22) and in each case adjoining the third angular range 41, extends across in each case one (further) angular range by ±1 to ±6 angular degrees, in particular ±1.5 to ±2.5 angular degrees.

FIG. 10 shows a tripod constant velocity joint 2 in a perspective view. An outer joint part 36 has three clearances 37 which run in the axial direction 56 (into the plane of illustration) and in which the roller elements 28 are disposed so as to be displaceable in the axial direction 56. The roller elements 28 are disposed on projections 5 of an inner joint part 1. In the extended (not deflected) state of the tripod constant velocity joint 2 the height 11, the third plane 18, the maximum diameter 12, and the central plane 22 are substantially in mutual alignment. Emanating here for example from the outer joint part 36, a torque is transmitted in the circumferential direction 24 via the guide faces 44 and the outer circumferential face 38 of the roller element 28 and further via the inner circumferential face 29 of the roller element 28 to the crowned circumferential face 9 of the projections 5, such that the inner joint part 1 conjointly rotates with the outer joint part 36 in the circumferential direction 24. A support face 45 which here is disposed so as to be centric in relation to the guide faces 44 in the outer joint part 36 and in this way limits a tilt movement of the roller element 28 is provided in the respective clearance 37.

FIG. 11 shows a further variant of embodiment of the design of an outer joint part 36, wherein two support faces 45 for the roller elements 28 are provided in the clearance 37. Said support faces 45 are identifiably disposed so as to be eccentric and in each case adjacent to the guide faces 44.

FIG. 12 shows a tripod constant velocity joint 2 in a sectional side view, wherein an outer joint part 36 having clearances 37 and guide faces 44 disposed in the latter receives a roller element 28 which is disposed so as to be displaceable in the axial direction 56. The roller elements 28 are disposed on projections 5, wherein it can be seen here that the inner joint part 1 in relation to the outer joint part 36 is deflected about an angle of deflection 55. Accordingly, an angle of deflection 55 is configured between the rotation axis 4 and the joint axis 54. The guide faces 44 have a centric plane 66 which extends so as to be parallel with the joint axis 54 of the outer joint part 36. It can be seen that the roller element 28 plunges into the cut-out/relief groove in the region of the transition 58 having the minimum transition radius 25, such that the maximum possible angle of deflection 55 is enlarged (cf. also FIG. 13).

Figure 13:
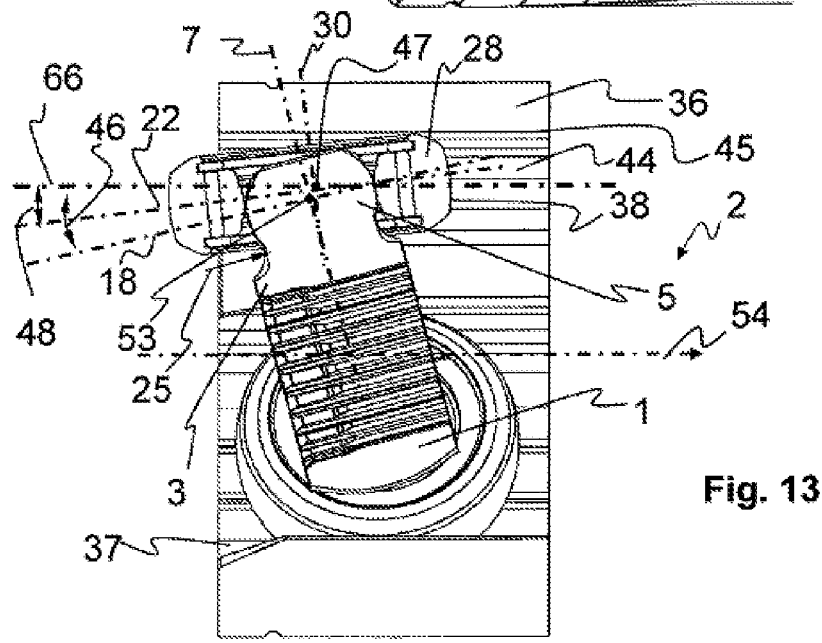
FIG. 13 shows the tripod constant velocity joint according to FIG. 12, likewise in a sectional side view.

FIG. 13 shows a tripod constant velocity joint 2 in a sectional side view, wherein the inner joint part 1 in relation to the outer joint part 36 is disposed so as to be deflected about an angle of deflection 55 (cf. FIG. 12). Roller elements 28 are disposed on the projection 5, wherein the roller element 28 in relation to the joint axis 54 and in relation to the third plane 18 of the projection 5 is disposed so as to be tilted. On account of its specially shaped and crowned outer circumferential face 38 and of the correspondingly shaped guide faces 44, the roller element 28 may perform a tilt movement 46 about a tilt axis 47. This tilt axis 47 of the roller element 28 is the sectional line of the central plane 22 of the roller element 28 having the centric plane 66 of the guide faces 44 which runs parallel with the joint axis 54 of the outer joint part 36. The at least one support face 45 may be disposed such that the roller elements 28 are tiltable about the tilt axis 47 by a tilt angle 48 range of at maximum 10 angular degrees. In particular, the tilt angle 48 range is at maximum ±10 angular degrees (about a normal position), in particular at maximum ±6 angular degrees about the tilt axis 47.

The tilt axis 47 runs parallel with the axis 53 which is formed by the third plane 18 of the projection 5 and by the longitudinal axis 7 of the projection. It can be seen that the roller element 28 in relation to the centric plane 66 of the clearance 37 tilts about the tilt angle 48.

On account of the tilt movement 46 about the tilt axis 47, the angle of deflection 55 between the inner joint part 1 and the outer joint part 66 may be further enlarged, since the roller element 28 together with the inner joint part 1 tilts up to a tilt angle 48, and limiting the angle of deflection 55 by way of impact of the roller element 28 on the inner joint part 1 only arises in the case of very large angles of deflection 55.

The tilt movement 46 of the roller element 28 is limited by the support faces 45 in the clearance 37 of the outer joint part 36. In this way, wedging of the roller element 28 in the guide faces 44 of the clearance 37 is prevented.

Figure 14:
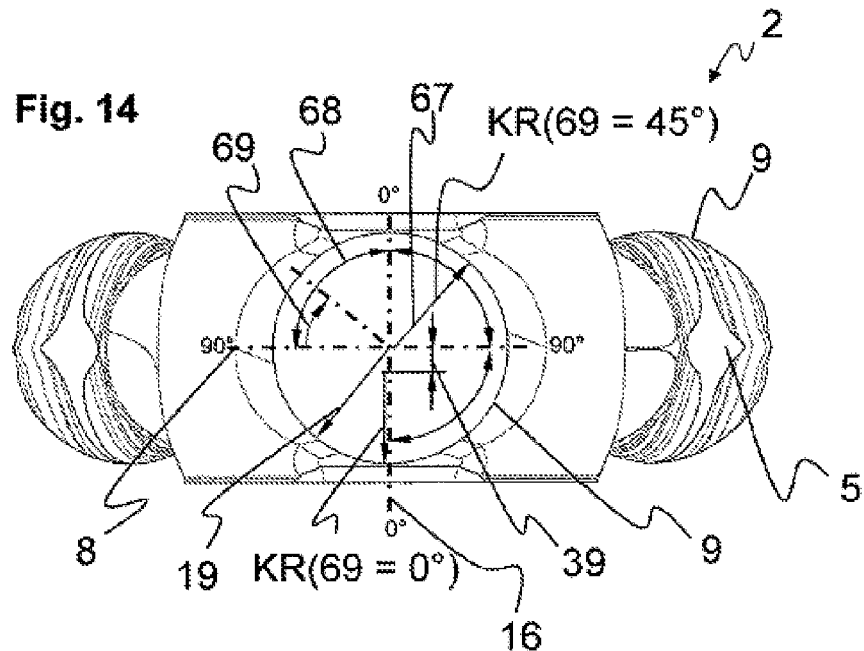
FIG. 14 shows the inner joint part in a plan view, in order to illustrate the second curvature radius.

FIG. 14 shows the inner joint part 1 in a plan view, in order to illustrate the second curvature radius 67. A fourth angular range 68 extends in the third plane 18 of each projection 5, in each case between the first plane 8 and the second plane 16. The profile of the circumferential face 9 of the projection 5 along the radial direction 6, emanating from the rotation axis (not illustrated here) is in each case formed by a surface line. This surface line in the intersection point between the third plane, the circumferential face 9 of the projection 5, and an angular value 69 within the fourth angular range 68, is in each case formed by a second curvature radius 67. The value of this second curvature radius 67, emanating from the first curvature radius 17 of the first surface line 10 in the region of the first plane 8 (KR(angular value 69=90°=eKRmax) up to the (second) curvature radius of the second surface line 15 in the region of the second plane 16 (KR(angular value 69=0°=IKR-distance), continuously varies along the fourth angular range 68. This (second) curvature radius of the second surface line 15, according to the description of FIG. 4, corresponds to the inner sphere radius 19 minus the distance 39. In the case of an angular value 69 of 45°, the second curvature radius 67 corresponds to the inner sphere radius 19 (KR(angular value 69=45°=IKR).

Figure 15:
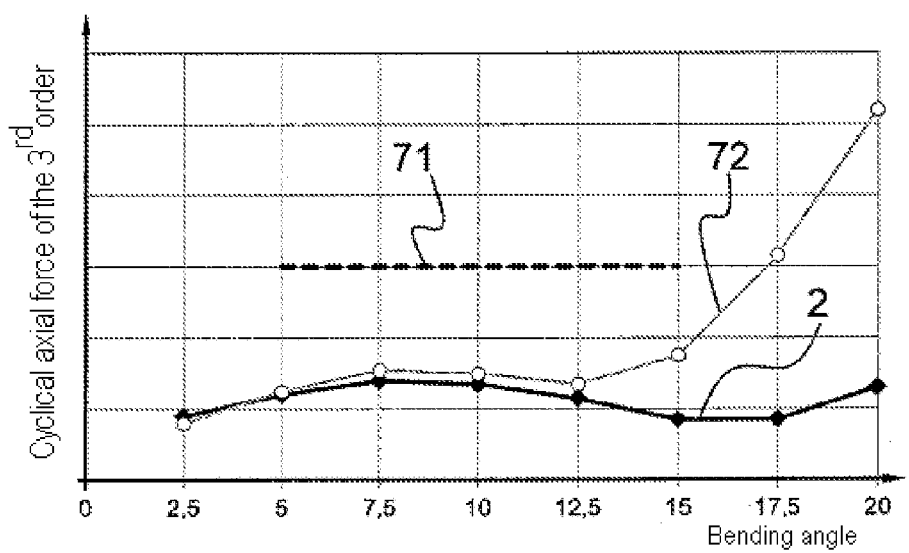
FIG. 15 shows a diagram for illustrating the profile of the cyclical axial force of the $3^{rd}$ order, depending on the angle of deflection.

FIG. 15 shows a diagram in order to illustrate the profile of the cyclical axial force of the $3^{rd}$ order 70, depending on the angle of deflection 55 of the tripod constant velocity joint 2. The cyclical axial force of the $3^{rd}$ order 70 is that variable of the tripod constant velocity joint 2 that determines the NVH (noise, vibration, harshness) behavior. The particular embodiment of the projection 5 and of the roller element 28 has the effect that the cyclical axial force of the $3^{rd}$ order 70 has only minor values, even in the case of comparatively large angles of deflection 55. The advantage of the tripod constant velocity joint 2 in comparison with a joint of the prior art 72 (for example according to DE 101 06 727 B4, or to EP 1 505 308 A1) becomes apparent specifically in the case of comparatively large angles of deflection 55. The profile of the cyclical axial force of the $3^{rd}$ order 70 remains considerably below the acceptance limit which is defined for such joints. The tripod constant velocity joint 2 which is being proposed here is thus specifically suitable for employment in cases where primarily comparatively large angles of deflection 55 are present during operation.

In a preemptive manner it should finally be pointed out that the combinations of technical features as shown in the figures are not generally mandatory. In this way, technical features of one figure may be combined with other technical features of a further figure and/or with those of the general description, unless the combination of features has in a particular instance been explicitly stated and/or a person skilled in the art realizes that the basic functions of the device would no longer be provided.

The invention claimed is:

1. An inner joint part of a tripod constant velocity joint, comprising a hub having a rotation axis and three projections, each of the three projections extending outwardly from the hub in a radial direction and having a transition region adjoining the hub, and a bearing region, wherein:
   each projection has a longitudinal axis and, in the bearing region, a crowned circumferential face;
   the inner joint part has a first plane that comprises all longitudinal axes of the projections and that is perpendicular to the rotation axis;
   the crowned circumferential face of each projection forms a first surface line which runs in the first plane, wherein the projection has a height along the longitudinal axis, the height having a reference point along the longitudinal axis where the projection has a maximum diameter perpendicular to the longitudinal axis, and the projection defines an inner sphere having an inner sphere radius and a midpoint on the longitudinal axis at the reference point, said inner sphere contacting opposite contact points of the first surface line;
   the first surface line of each projection extends at least past an arc defined by respective first angular ranges, wherein the first angular ranges are adjacent to the respective contact point and are outside the inner sphere, wherein each first angular range emanates from the midpoint of the inner sphere and extends a maximum of about twenty degrees to both sides of the respective contact point;
   a second surface line of the crowned circumferential face of each projection is present in a second plane, wherein the second plane is perpendicular to the first plane and includes the longitudinal axis of the respective projection; and
   the second surface line touches the inner sphere only at the height of the maximum diameter of the projection in touch points, and extends within a second arc defined by respective second angular ranges, wherein the second angular ranges are adjacent to the respective touch point and are within the inner sphere, wherein each second angular range emanates from the midpoint of the inner sphere and in each case extends to a maximum of about thirty-five degrees to both sides of the respective touch point.

2. The inner joint part of claim 1, wherein the first surface line has a first curvature radius in the bearing region which is at a maximum at least at the contact point.

3. The inner joint part of claim 2, wherein a ratio of the first curvature radius in the contact point to the inner sphere radius is at least about fifty.

4. The inner joint part of claim 3, wherein the ratio is in a range of about 100 to 1000.

5. The inner joint part of claim 1, wherein:
the first surface line of each projection at the contact points and, in a region within the first angular ranges, is a straight line; and
the first angular range emanates from the midpoint of the inner sphere and at least on one side extends so as to be adjacent to the contact point by about two to twenty degrees.

6. The inner joint part of claim 1, wherein:
each projection in the transition region defines a transition radius, the value of which in a circumferential direction about the longitudinal axis of the projection is varied; and
the values of the transition radius in the first plane are at a maximum and in the circumferential direction are at a minimum and offset thereto by about ninety degrees.

7. The inner joint part of claim 6, wherein a ratio of the maximum value of the transition radius to the minimum value of the transition radius is in a range from five to ten.

8. The inner joint part of claim 1, wherein the first surface line of each projection in a region between the contact point and the hub has a spacing from the longitudinal axis of the projection which corresponds to at least the inner sphere radius.

9. A tripod constant velocity joint comprising at least:
an inner joint part comprising a hub having a rotation axis and three projections, each of the three projections extending outwardly from the hub in a radial direction and having a transition region adjoining the hub, and a bearing region, wherein:
each projection has a longitudinal axis and, in the bearing region, a crowned circumferential face;
the inner joint part has a first plane that comprises all longitudinal axes of the projections and that is perpendicular to the rotation axis;
the crowned circumferential face of each projection forms a first surface line which runs in the first plane, wherein the projection has a height along the longitudinal axis, the height having a reference point along the longitudinal axis where the projection has a maximum diameter, and the projection defines an inner sphere having an inner sphere radius and a midpoint on the longitudinal axis at the reference point, said inner sphere contacting opposite contact points of the first surface line;
the first surface line of each projection extends at least past an arc defined by respective first angular ranges, wherein the first angular ranges are adjacent to the respective contact point and are outside the inner sphere, wherein each first angular range emanates from the midpoint of the inner sphere and extends a maximum of about twenty degrees to both sides of the respective contact point;
a second surface line of the crowned circumferential face of each projection is present in a second plane, wherein the second plane is perpendicular to the first plane and includes the longitudinal axis of the respective projection; and
the second surface line touches the inner sphere only at the height of the maximum diameter of the projection in touch points, and extends within a second arc defined by respective second angular ranges, wherein the second angular ranges are adjacent to the respective touch point and are within the inner sphere, wherein each second angular range emanates from the midpoint of the inner sphere and in each case extends to a maximum of about thirty-five degrees to both sides of the respective touch point;
on each of the projections, a rotatably mounted roller element having a center and an outer circumferential face and a convex-shaped inner circumferential face which are configured so as to be rotationally symmetrical about a central axis of the roller element, wherein a median plane which includes the central axis of the roller element and defines a profile line of the convex inner circumferential face is present, wherein the profile line configures a profile line radius of which the value is at a maximum in a central region about a central plane which is disposed so as to go through the center and to be perpendicular to the median plane, and wherein the value of the profile line radius is smaller in an adjacent region;
an outer joint part having axially running clearances for guiding in each case one roller element;
wherein opposite regions of the second surface line of each projection, which during operation are in contact with the convex inner circumferential faces of the roller elements, in each case form one segment of a contour circle, the circle centers of said segments in each case being disposed at a distance from the longitudinal axis of the projection, wherein a ratio of the distance to the inner sphere radius is in a range of about 0.02 to 0.38.

10. A tripod constant velocity joint comprising at least:
an inner joint part comprising a hub having a rotation axis and three projections, each of the three projections extending outwardly from the hub in a radial direction and having a transition region adjoining the hub, and a bearing region, wherein:
each projection has a longitudinal axis and, in the bearing region, a crowned circumferential face;
the inner joint part has a first plane that comprises all longitudinal axes of the projections and that is perpendicular to the rotation axis;
the crowned circumferential face of each projection forms a first surface line which runs in the first plane, wherein the projection has a height along the longitudinal axis, the height having a reference point along the longitudinal axis where the projection has a maximum diameter, at which a maximum diameter of the projection is present, and the projection defines an inner sphere having an inner sphere radius is predefined, and a midpoint of said inner sphere lying on the longitudinal axis at the reference point, said inner sphere contacting opposite contact points of the first surface line;
the first surface line of each projection extends at least past an arc defined by respective first angular ranges, wherein the first angular ranges are adjacent to the respective contact point and which are outside the inner sphere, wherein each first angular range emanates from the midpoint of the inner sphere and extends a maximum of about twenty degrees to both sides of the respective contact point;
a second surface line of the crowned circumferential face of each projection is present in a second plane, wherein the second plane is disposed so as to be perpendicular to the first plane and includes the longitudinal axis of the respective projection; and
the second surface line touches the inner sphere only at the height of the maximum diameter of the projection in touch points, and extends within a second arc defined by respective second angular ranges, wherein the second angular ranges are adjacent to the respective touch point and which are within the inner sphere, wherein each second angular range emanates from the midpoint of the inner sphere and in each case extends to a maximum of about thirty-five degrees to both sides of the respective touch point;

on each of the projections, a rotatably mounted roller element having a center and an outer circumferential face and a convex-shaped inner circumferential face which are configured so as to be rotationally symmetrical about a central axis of the roller element, wherein a median plane which includes the central axis of the roller element and defines a profile line of the convex inner circumferential face is present, wherein the profile line configures a profile line radius of which the value is at a maximum in a central region about a central plane which is disposed so as to go through the center and to be perpendicular to the median plane, and wherein the value of the profile line radius is smaller in an adjacent region; and an outer joint part having axially running clearances for guiding in each case one roller element;

wherein the clearances have a pair of axially running guide faces on which the roller elements are supported in a circumferential direction, wherein at least one support face which limits a tilt movement of the roller elements about a tilt axis is disposed between the pair of guide faces, and wherein the tilt axis of the roller elements is formed by the intersection line of the central plane of the roller element and the centric plane of the guide faces which runs parallel with the joint axis of the outer joint part.

11. Tripod constant velocity joint of claim 10, further comprising two support faces, each disposed so as to be adjacent to the guide faces.

12. Tripod constant velocity joint of claim 11, wherein the at least one support face is disposed such that the roller elements are tiltable about the tilt axis by a tilt angle range of a maximum of about ten degrees.

13. An inner joint part of a tripod constant velocity joint, comprising a hub having a rotation axis and three projections, each of the three projections extending outwardly from the hub in a radial direction and having a transition region adjoining the hub, and a bearing region, wherein:

each projection has a longitudinal axis and, in the bearing region, a crowned circumferential face;

the inner joint part has a first plane that comprises all longitudinal axes of the projections and that is perpendicular to the rotation axis;

the crowned circumferential face of each projection forms a first surface line which runs in the first plane, wherein the projection has a height along the longitudinal axis, the height having a reference point along the longitudinal axis where the projection has a maximum diameter, and the projection defines an inner sphere having an inner sphere radius and a midpoint on the longitudinal axis at the reference point, said inner sphere contacting opposite contact points of the first surface line;

the first surface line of each projection extends at least past an arc defined by respective first angular ranges, wherein the first angular ranges are adjacent to the respective contact point and are outside the inner sphere, wherein each first angular range emanates from the midpoint of the inner sphere and extends a maximum of about twenty degrees to both sides of the respective contact point;

a second surface line of the crowned circumferential face of each projection is present in a second plane, wherein the second plane is perpendicular to the first plane and includes the longitudinal axis of the respective projection; and the second surface line touches the inner sphere only at the height of the maximum diameter of the projection in touch points, wherein a first maximum diameter in the first plane deviates from a second maximum diameter of the projection in the second plane, such that a cross section through the projection in a third plane perpendicular to both the longitudinal axis of the respective projection as well as to the first plane is shaped in an ellipse; wherein the second surface line extends within a second arc defined by second angular ranges adjacent to a respective touch point and within the inner sphere, wherein each second angular range emanates from the midpoint of the inner sphere and in each case extends to a maximum of about thirty-five degrees to both sides of the respective touch point.

* * * * *